(12) United States Patent
Hwang et al.

(10) Patent No.: US 9,407,405 B2
(45) Date of Patent: Aug. 2, 2016

(54) METHOD OF RECEIVING DOWNLINK DATA AND WIRELESS DEVICE USING THE METHOD

(71) Applicant: LG ELECTRONICS INC., Seoul (KR)

(72) Inventors: Daesung Hwang, Anyang-si (KR); Bonghoe Kim, Anyang-si (KR); Dongyoun Seo, Anyang-si (KR); Yunjung Yi, Anyang-si (KR); Joonkui Ahn, Anyang-si (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 14/390,724

(22) PCT Filed: Apr. 5, 2013

(86) PCT No.: PCT/KR2013/002888
§ 371 (c)(1),
(2) Date: Oct. 3, 2014

(87) PCT Pub. No.: WO2013/151395
PCT Pub. Date: Oct. 10, 2013

(65) Prior Publication Data
US 2015/0092691 A1 Apr. 2, 2015

Related U.S. Application Data

(60) Provisional application No. 61/620,985, filed on Apr. 6, 2012, provisional application No. 61/637,830, filed on Apr. 24, 2012, provisional application No. 61/764,999, filed on Feb. 14, 2013.

(51) Int. Cl.
*H04L 5/00* (2006.01)
*H04L 27/26* (2006.01)
(Continued)

(52) U.S. Cl.
CPC .............. *H04L 5/003* (2013.01); *H04L 5/0048* (2013.01); *H04L 27/2647* (2013.01);
(Continued)

(58) Field of Classification Search
None
See application file for complete search history.

(56) References Cited

U.S. PATENT DOCUMENTS

2010/0254471 A1* 10/2010 Ko .................. H04L 5/0023
375/260
2012/0281554 A1* 11/2012 Gao .................... H04W 48/12
370/252
(Continued)

FOREIGN PATENT DOCUMENTS

WO   WO 2011/102683 A2   8/2011

OTHER PUBLICATIONS

Ericsson, "Signalling Support for Reduced Non-Zero Power ABS", 3GPP TSG-RAN WG1 #68, R1-120804, Dresden, Germany, Feb. 6-10, 2012, pp. 1-4.
(Continued)

*Primary Examiner* — Diane Lo
(74) *Attorney, Agent, or Firm* — Birch, Stewart, Kolasch & Birch, LLP (57) ABSTRACT

A method of receiving downlink data in a wireless communication system and a wireless device are provided. The wireless device determines energy per resource element (EPRE) of a reference signal that is received in a transmission bandwidth of an orthogonal frequency division multiplexing (OFDM) symbol and determines the power ratio of the EPRE of the reference signal to the EPRE of a Physical Downlink Shared Channel (PDSCH) on the basis of the transmission bandwidth. The wireless device determines the EPRE of the PDSCH on the basis of the EPRE of the reference signal and the power ratio and demodulates the PDSCH.

9 Claims, 9 Drawing Sheets

(51) Int. Cl.
*H04W 52/02* (2009.01)
*H04W 52/32* (2009.01)
*H04W 52/14* (2009.01)
*H04W 52/26* (2009.01)

(52) U.S. Cl.
CPC ......... *H04W 52/267* (2013.01); *H04W 52/325* (2013.01); *H04L 5/001* (2013.01); *H04L 5/0007* (2013.01); *H04W 52/143* (2013.01)

(56) References Cited

U.S. PATENT DOCUMENTS

2013/0114434 A1* 5/2013 Muruganathan ...... H04W 16/14 370/252

2013/0176952 A1* 7/2013 Shin ....................... H04L 5/001 370/329

OTHER PUBLICATIONS

Kddi, "Performance Evaluations of the Signaling Schemes for Transmission Power Information", 3GPP TSG RAN WG1 Meeting #68, R1-120673, Dresden, Germany, Feb. 6-10, 2012, pp. 1-3.

Motorola Mobility, "EPDCCH Design Aspects", 3GPP TSG RAN WG1 Meeting #68bis, R1-121583, Jeju, Korea, Mar. 26-30, 2012, pp. 1-3.

Samsung, "Further Discussions on Signalling Support for Non-Zero Transmit Power ABS", 3GPP TSG-RAN WG1#68bis meeting, R1-121619, Jeju, Korea, Mar. 26-30, 2012, pp. 1-4.

* cited by examiner

METHOD OF RECEIVING DOWNLINK DATA AND WIRELESS DEVICE USING THE METHOD

CROSS REFERENCE TO RELATED APPLICATIONS

This application is the National Phase of PCT/KR2013/002888 filed on Apr. 5, 2013, which claims priority under 35 U.S.C. 119(e) to U.S. Provisional Application No. 61/620,985 filed on Apr. 6, 2012, to U.S. Provisional Application No. 61/637,830 filed on Apr. 24, 2012 and to U.S. Provisional Application No. 61/764,999 filed on Feb. 14, 2013, all of which are incorporated by reference herein in its entirety.

BACKGROUND OF THE INVENTION

1. Field of the Invention

The present invention relates to wireless communication and, more particularly, to a method of receiving downlink data using the allocation of downlink power in a wireless communication system and a wireless device using the same.

2. Related Art $3^{rd}$ generation partnership project (3GPP) Long Term Evolution (LTE), that is, an improvement of a Universal Mobile Telecommunication System (UMTS), is introduced as the 3GPP release 8. The 3GPP LTE uses Orthogonal Frequency Division Multiple Access (OFDMA) in downlink, and uses Single Carrier-Frequency Division Multiple Access (SC-FDMA) in uplink. The 3GPP LTE employs Multiple Input Multiple Output (MIMO) having up to four antennas. In recent years, there is an ongoing discussion on 3GPP LTE-Advanced (LTE-A) that is an evolution of the 3GPP LTE.

As disclosed in 3GPP TS 36.211 V8.7.0 (May 2009) "Evolved Universal Terrestrial Radio Access (E-UTRA); Physical Channels and Modulation (Release 8)," in 3GPP LTE/LTE-A, physical channels may be divided into a physical downlink shared channel (PDSCH) and a physical downlink control channel (PDCCH), that is, downlink channels, and a physical uplink shared channel (PUSCH) and a physical uplink control channel (PUCCH), that is, uplink channels.

The allocation of downlink power is one of major factors for securing the communication reliability of downlink data. A BS determines the transmission power of a reference signal and the transmission power of a data channel and sends downlink data on the reference signal and the data channel. UE determines the transmission power of a data channel based on the transmission power of the reference signal received from the BS.

The transmission power of the reference signal is basic information used to determine the transmission power of the data channel. As reference signals for various uses are introduce, there is a need for a method for determining the transmission power of a reference signal.

SUMMARY OF THE INVENTION

The present invention provides a method of receiving downlink data using the allocation of downlink power and a wireless device using the same.

The present invention provides a method of allocating downlink power and a BS using the same.

In an aspect, a method for receiving downlink data in a wireless communication system is provided. The method includes determining an Energy Per Resource Element (EPRE) of a reference signal received in a transmission bandwidth of an Orthogonal Frequency Division Multiplexing (OFDM) symbol, determining a power ratio of the EPRE of the reference signal to an EPRE of a physical downlink shared channel (PDSCH) based on the transmission bandwidth, determining the EPRE of the PDSCH based on the EPRE of the reference signal and the power ratio, and demodulating the PDSCH based on the EPRE of the PDSCH.

The transmission bandwidth may be smaller than a system bandwidth.

The power ratio is determined based on X, $N_{RB}$, and $M_{RB}$, wherein X is a number of subcarriers to which the reference signal is mapped in the transmission bandwidth, $N_{RB}$ is a total number of Resource Blocks (RBs) in a system bandwidth, and $M_{RB}$ is a number of subcarriers in an RB.

In another aspect, a wireless device for receiving downlink data in a wireless communication system is provided. The wireless device includes a Radio Frequency (RF) unit configured to transmit and receive radio signals, and a processor connected to the RF unit and configured to determine an Energy Per Resource Element (EPRE) of a reference signal received in a transmission bandwidth of an Orthogonal Frequency Division Multiplexing (OFDM) symbol, determine a power ratio of the EPRE of the reference signal to an EPRE of a physical downlink shared channel (PDSCH) based on the transmission bandwidth, determine the EPRE of the PDSCH based on the EPRE of the reference signal and the power ratio, and demodulate the PDSCH based on the EPRE of the PDSCH.

Downlink power can be allocated based on the transmission bandwidth of a reference signal. Furthermore, reliability in demodulating downlink data can be improved.

DESCRIPTION OF EXEMPLARY EMBODIMENTS

A wireless device may be fixed or may have mobility. The wireless device may be called another term, such as User Equipment (UE), a Mobile Station (MS), a User Terminal (UT), a Subscriber Station (SS), or a Mobile Terminal (MT). In general, a Base station (BS) refers to a fixed station that communicates with wireless devices and may be called another term, such as an evolved-NodeB (eNB), a Base Transceiver System (BTS), or an access point.

Hereinafter, an example in which the present invention is applied based on 3$^{rd}$ Generation Partnership Project (3GPP) Long Term Evolution (LTE) or 3GPP LTE-Advanced (A) is described. This is only an example, and the present invention may be applied to various wireless communication systems. Hereinafter, LTE includes LTE and/or LTE-A.

Figure 1:
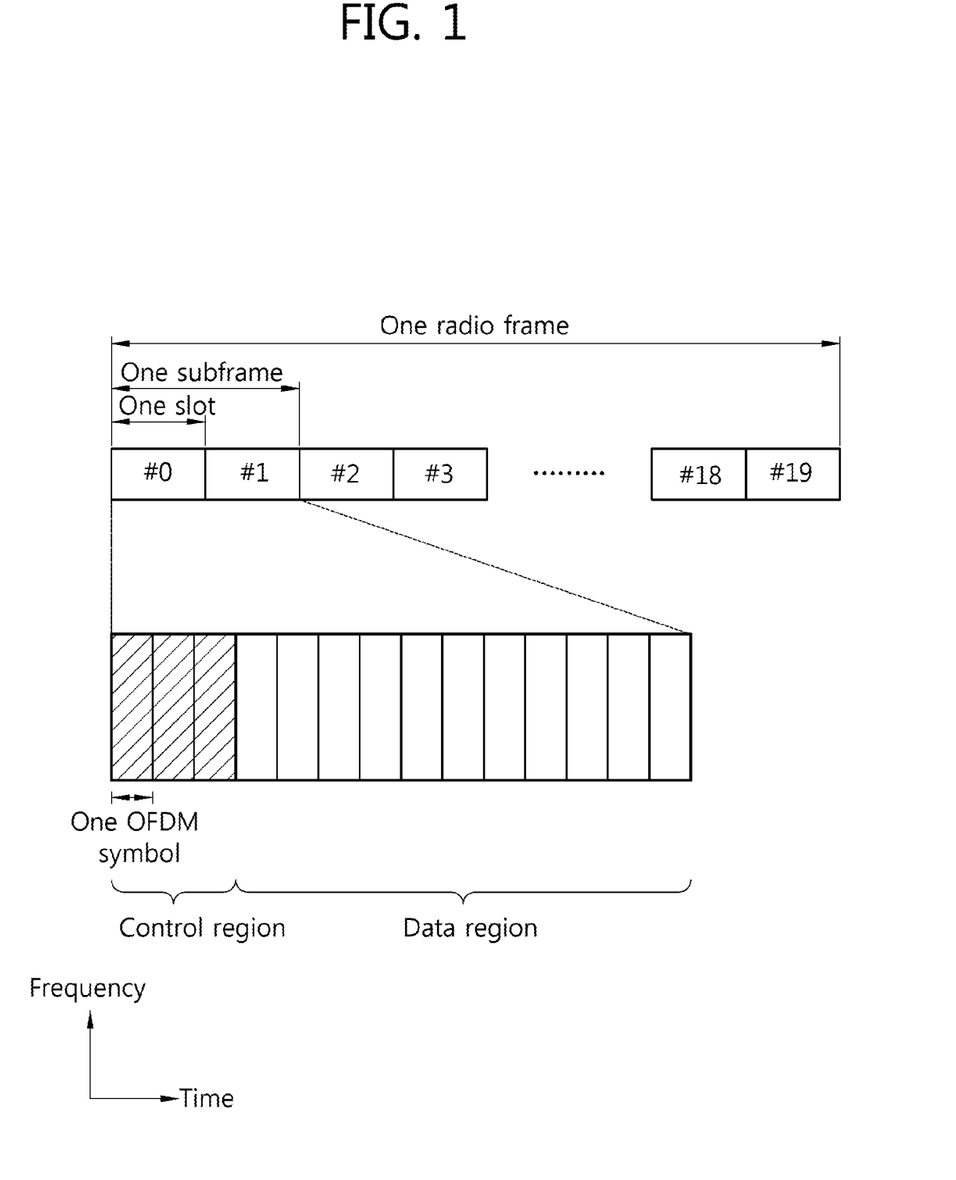
FIG. 1 illustrates the configuration of a downlink radio frame in 3GPP LTE.

FIG. 1 illustrates the configuration of a downlink radio frame in 3GPP LTE. For the configuration of the downlink radio frame, reference may be made to Paragraph 6 of 3GPP TS 36.211 V8.7.0 (May 2009) "Evolved Universal Terrestrial Radio Access (E-UTRA); Physical Channels and Modulation (Release 8)".

The radio frame includes 10 subframes to which indices 0~9 are assigned. A single subframe includes two contiguous slots. The time taken to send a single subframe is called a Transmission Time Interval (TTI). For example, the length of a single subframe may be 1 ms, and the length of a single slot may be 0.5 ms.

A single slot may include a plurality of Orthogonal Frequency Division Multiplexing (OFDM) symbols in a time domain. The OFDM symbol is only for representing a single symbol period in the time domain because 3GPP LTE uses Orthogonal Frequency Division Multiple Access (OFDMA) in downlink (DL), and there is no limit to a multiple access method or name. For example, the OFDM symbol may be called another term, such as a Single Carrier-Frequency Division Multiple Access (SC-FDMA) symbol or a symbol period.

A single slot is illustrated as including 7 OFDM symbols, but the number of OFDM symbols included in a single slot may be changed depending on the length of a Cyclic Prefix (CP). In accordance with 3GPP TS 36.211 V8.7.0, a single slot includes 7 OFDM symbols in a normal CP, and a single slot includes 6 OFDM symbols in an extended CP.

A Resource Block (RB) is a resource allocation unit and includes a plurality of subcarriers in a single slot. For example, if a single slot includes 7 OFDM symbols in the time domain and a resource block includes 12 subcarriers in the frequency domain, a single resource block may include 7×12 Resource Elements (REs).

A DL subframe is divided into a control region and a data region in the time domain. The control region includes a maximum of former 3 OFDM symbols of a first slot within the subframe, but the number of OFDM symbols included in the control region may be changed. Physical downlink control channels (PDCCHs) and other control channels are allocated to the control region, and PDSCHs are allocated to the data region.

As disclosed in 3GPP TS 36.211 V8.7.0, 3GPP LTE, physical channels may be divided into a physical downlink shared channel (PDSCH) and a physical uplink shared channel (PUSCH), that is, data channels, and a physical downlink control channel (PDCCH), a physical control format indicator channel (PCFICH), a physical hybrid-ARQ indicator channel (PHICH), and a physical uplink control channel (PUCCH), that is, control channels.

A PCFICH transmitted in the first OFDM symbol of a subframe carries a Control Format Indicator (CFI) regarding the number of OFDM symbol (i.e., the size of a control region) used to send control channels within the subframe. UE first receives a CFI on a PCFICH and monitors a PDCCH.

Unlike a PDCCH, a PCFICH is transmitted through fixed PCFICH resources of a subframe without using blind decoding.

A PHICH carries positive-acknowledgement (ACK)/negative-acknowledgement (NACK) signals for an uplink Hybrid Automatic Repeat reQuest (HARQ). ACK/NACK signals for uplink (UL) data on a PUSCH transmitted by UE is transmitted on a PHICH.

A physical broadcast channel (PBCH) is transmitted in the former 4 OFDM symbols of a second slot within the first subframe of the radio frame. The PBCH carries system information that is essential for UE to communicate with a BS. System information transmitted through the PBCH is called a Master Information Block (MIB). In contrast, system information transmitted on a PDSCH indicated by a PDCCH is called a System Information Block (SIB).

Control information transmitted through a PDCCH is called Downlink Control Information (DCI). The DCI may include the resource allocation of a PDSCH (this is also called a downlink (DL) grant), the resource allocation of a PUSCH (this is also called an uplink (UL) grant), a set of transmit power control commands for pieces of UE within a specific UE group and/or the activation of a Voice over Internet Protocol (VoIP).

In 3GPP LTE, blind decoding is used to detect a PDCCH. Blind decoding is a method of checking whether or not a corresponding PDCCH is its own control channel by demasking a desired identifier to the Cyclic Redundancy Check (CRC) of the received PDCCH (this is called a candidate PDCCH) and checking an CRC error.

A BS determines a PDCCH format based on DCI to be transmitted to UE, attaches CRC to the DCI, and masks a unique identifier (this is also called a Radio Network Temporary Identifier (RNTI)) to the CRC depending on the owner or use of a PDCCH.

The control region within the subframe includes a plurality of Control Channel Elements (CCEs). The CCE is a logical allocation unit used to provide a PDCCH with a code rate according to the state of a wireless channel. The CCE corresponds to a plurality of Resource Element Groups (REGs). The REG includes a plurality of resource elements. The format of a PDCCH and the number of bits of the PDCCH are determined in accordance with the relationship between the number of CCEs and a code rate provided by the CCEs.

A single REG includes 4 REs, and a single CCE includes 9 REGs. In order to configure a single PDCCH, {1, 2, 4, 8} CCEs may be used, and each of the {1, 2, 4, 8} elements is called a CCE aggregation level.

The number of CCEs used to send a PDCCH is determined by a BS depending on a channel state. For example, with respect to UE having a good DL channel state, a single CCE may be used for PDCCH transmission. With respect to UE having a poor DL channel state, 8 CCEs may be used for PDCCH transmission.

A control channel including one or more CCEs is subject to interleaving an REG unit, subject to a cyclic shift based on an identifier (ID), and then mapped to physical resources.

In accordance with 3GPP TS 36.211 V8.7.0, an uplink channel includes a PUSCH, a PUCCH, a Sounding Reference Signal (SRS), and a Physical Random Access Channel (PRACH).

A PUCCH supports multiple formats. A PUCCH having a different number of bits may be used in each subframe in accordance with a modulation scheme dependent on a PUCCH format. A PUCCH format 1 is used to send a Scheduling Request (SR). A PUCCH format 1a/1b is used to send an ACK/NACK signal for an HARQ. A PUCCH format 2 is used to send a CQI. A PUCCH format 2a/2b is used for the simultaneous transmission of a CQI and an ACK/NACK signal. When only an ACK/NACK signal is transmitted in a subframe, the PUCCH format 1a/1b is used. When an SR is solely transmitted, the PUCCH format 1 is used. When an SR and an ACK/NACK signal are simultaneously transmitted, the PUCCH format 1 is used, and an ACK/NACK signal is modulated into resources allocated to the SR and is then transmitted.

Figure 2:
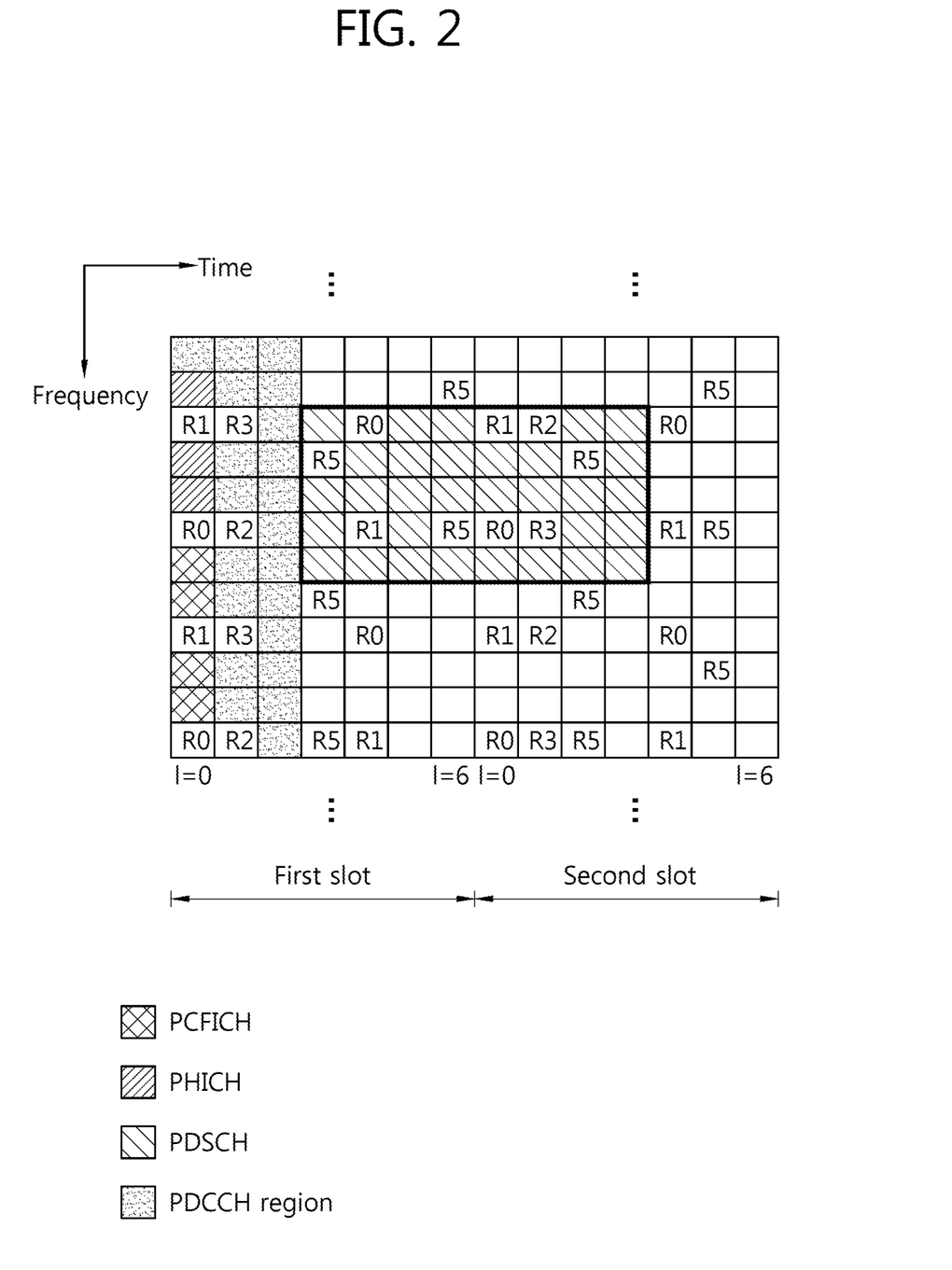
FIG. 2 illustrates an example in which reference signals and control channels are disposed in a DL subframe of 3GPP LTE.

FIG. 2 illustrates an example in which reference signals and control channels are disposed in a DL subframe of 3GPP LTE.

A control region (or a PDCCH region) includes former 3 OFDM symbols, and a data region in which PDSCHs are transmitted includes the remaining OFDM symbols.

A PCFICH, a PHICH and/or a PDCCH are transmitted in the control region. The CFI of the PCFICH denotes the 3 OFDM symbols. A region that is included in the control region and from which resources in which a PCFICH and/or a PHICH are transmitted are excluded is a PDCCH region in which a PDCCH is monitored.

Furthermore, various reference signals are transmitted in the subframe.

A Cell-specific Reference Signal (CRS) may be received by all the wireless devices within a cell and is transmitted over the entire downlink band. In the drawing, 'R0' is indicative of a Resource Element (RE) in which the CRS of a first antenna port is transmitted, 'R1' is indicative of an RE in which the CRS of a second antenna port is transmitted, 'R2' is indicative of an RE in which the CRS of a third antenna port is transmitted, and 'R3' is indicative of an RE in which the CRS of a fourth antenna port is transmitted.

An RS sequence $r_{l,ns}(m)$ for the CRS is defined as in the following equation.

$$r_{l,ns}(m) = \frac{1}{\sqrt{2}}(1 - 2 \cdot c(2m)) + j\frac{1}{\sqrt{2}}(1 - 2 \cdot c(2m+1)) \quad \text{[Equation 1]}$$

In Equation 1, m=0, 1, . . . , $2N_{maxRB}-1$, $N_{maxRB}$ are a maximum number of RBs, ns is a slot number within a radio frame, and l is an OFDM symbol number within the slot.

A pseudo-random sequence c(i) is defined by a gold sequence having a length of 31.

$c(n) = (x_1(n+Nc) + x_2(n+Nc)) \mod 2$ $x_1(n+31) = (x_1(n+3) + x_1(n)) \mod 2$ $x_2(n+31) = (x_2(n+3) + x_2(n+2) + x_2(n+1) + x_2(n)) \mod 2$ [Equation 2]

In Equation 2, Nc=1600, and a first m-sequence is initialized to $x_1(0)=1$, $x_1(n)=0$, $n=1, 2, \ldots, 30$.

A second m-sequence is initialized to $c_{init}=2^{10}(7(ns+1)+l+1)(2N^{cell}_{ID}+1)+2N^{cell}_{ID}+N_{CP}$ at the start of each OFDM symbol. $N^{cell}_{ID}$ is the Physical Cell Identity (PCI) of a cell, and is $N_{CP}=1$ in a normal CP and $N_{CP}=0$ in an extended CP.

A UE-specific Reference Signal (URS) is transmitted in the subframe. A CRS is transmitted in the entire region of the subframe, whereas the URS is transmitted within the data region of the subframe and used to demodulate a corresponding PDSCH. In the drawing, 'R5' is indicative of an RE in which the URS is transmitted. The URS is also called a Dedicated Reference Signal (DRS) or a demodulation Reference Signal (DM-RS).

A URS is transmitted only in an RB to which a corresponding PDSCH is mapped. In the drawing, R5 is indicated in regions other than a region in which a PDSCH is transmitted, but this is for indicating the location of an RE to which a URS is mapped.

The URS is used by only a wireless device that receives a corresponding PDSCH. The RS sequence $r_{ns}(m)$ for the URS is the same as Equation 1. In this case, m=0, 1, . . . , $12N_{PDSCH,RB}-1$, and $N_{PDSCH,RB}$ is the number of RBs for the transmission of a corresponding PDSCH. A pseudo random sequence generator is initialized to $c_{init}=(\text{floor}(ns/2)+1)(2N^{cell}_{ID}+1)2^{16}+n_{RNTI}$ at the start of each subframe. $n_{RNTI}$ is the ID of a wireless device.

The above corresponds to a case where the URS is transmitted in a single antenna. When the URS is transmitted through multiple antennas, a pseudo random sequence generator is initialized to $c_{init}=(\text{floor}(ns/2)+1)(2N^{cell}_{ID}+1)2^{16}+n_{SCID}$ at the start of each subframe. $n_{SCID}$ is a parameter obtained from a DL grant (e.g., the DCI format 2B or 2C) related to the transmission of a PDSCH.

The allocation of downlink power is described below with reference to Paragraph 5.2 of 3GPP TS 36.213 V8.7.0 (May 2009).

A BS determines an Energy Per Resource Element (EPRE) for downlink transmission.

A wireless device may determine a Reference Signal (RS) EPRE based on RS transmission power given by the BS. In each OFDM symbol, a ratio of a PDSCH EPRE to an RS EPRE is indicated by $\rho_A$ or $\rho_B$. $\rho_A$ and $\rho_B$ are specific to a wireless device. $\rho_A$ or $\rho_B$ is determined depending on whether a CRS is included in a corresponding OFDM symbol. In 3GPP LTE, $\rho_A$ or $\rho_B$ is determined as follows.

TABLE 1

| Number of antenna ports | Index of OFDM symbol within slot in which $\rho_A$ is used | | Index of OFDM symbol within slot in which $\rho_B$ is used | |
|---|---|---|---|---|
| | Normal CP | Extended CP | Normal CP | Ext ended CP |
| 1 or 2 | 1, 2, 3, 5, 6 | 1, 2, 4, 5 | 1, 2, 3, 5, 6 | 1, 2, 4, 5 |
| 4 | 2, 3, 5, 6 | 2, 4, 5 | 2, 3, 5, 6 | 2, 4, 5 |

$\rho_A = \delta_{poweroffset} + P_A$ is calculated. $\delta_{poweroffset}$ is a specific value, and $P_A$ is a value given by the BS.

$\rho_A/\rho_B$ is determined by a parameter $P_B$ given by the BS as follows.

TABLE 2

| | $\rho_A/\rho_B$ | |
|---|---|---|
| $P_B$ | 1 antenna port | 2 or 4 antenna ports |
| 0 | 1 | 5/4 |
| 1 | 4/5 | 1 |
| 2 | 3/5 | 3/4 |
| 3 | 2/5 | 1/2 |

That is, in 3GPP LTE, $\rho_A$ or $\rho_B$ is determined based on the index of an OFDM symbol within a slot. $\rho_A$ is determined based on the parameter $P_B$ given by the BS. After $\rho_A$ is determined, $\rho_B$ is determined based on the parameter $P_B$ in accordance with Table 2.

In an existing wireless communication system based on 3GPP LTE/LTE-A, a reference signal, a synchronization signal, and a control channel are transmitted through DL carriers. A DL carrier based on 3GPP LTE/LTE-A is called a legacy carrier.

In the next-generation wireless communication system, however, a new carrier is introduced in order to reduce interference between a plurality of serving cells and improve the extensibility of a carrier. This is called an extended carrier or a New Carrier Type (NCT). A cell based on such an extended carrier is also called an extended cell.

In a legacy carrier, a CRS is transmitted in all the DL subframes of the entire system band. In contrast, in the NCT, a CRS is not transmitted or is transmitted in a specific DL subframe of some of a system band. Accordingly, the CRS is not used in demodulation and may be used only in synchronization tracking. In this sense, the CRS may be called a Tracking RS (TRS).

In a legacy carrier, a PDCCH is demodulated based on a CRS. In the NCT, however, a PDCCH may not be transmitted. In a legacy carrier, a CRS is used in data demodulation. In the NCT, however, only a URS (and/or a UE-specific RS) is used in data demodulation.

A legacy carrier may be configured as a primary cell or a secondary cell, but an extended cell may be configured as only a secondary cell.

As described above, in a legacy carrier, a CRS is transmitted over the entire band in all the subframes, and the transmission power of the CRS may be calculated based on a value given by a BS (this is called an RS power parameter). Furthermore, as illustrated in Table 1, in an existing system, a ratio of a PDSCH EPRE and an RS EPRE is changed depending on whether or not a CRS is present in an OFDM symbol in order to correct total transmission power that may vary depending on the CRS.

Hereinafter, an RS EPRE may include an EPRE obtained based on a CRS or an EPRE obtained based on a TRS. The PDSCH EPRE may include an EPRE used for traffic data transmission.

Hereinafter, a ratio of a PDSCH EPRE and an RS EPRE is indicated by a Power Ratio (PR). The PR may have a uniform value for all the REs within the same OFDM symbol. The PR of an OFDM symbol not including a CRS may be indicated by $\rho_A$, and the PR of an OFDM symbol including a CRS may be indicated by $\rho_B$.

The reason why the PR is divided into $\rho_A$ and $\rho_B$ depending on whether a CRS is present or not is as follows. That is, since a CRS is a criterion used to estimate a channel, an RS RE needs to be transmitted with high power compared to a PDSCH RE used for traffic data transmission. A PDSCH RE in an OFDM symbol including a CRS may be configured to have lower transmission power than a PDSCH RE in an OFDM symbol not including a CRS because high transmission power is allocated to a CRS RE. A wireless device may demodulate a modulation symbol to which 16-QAM or 64-QAM has been applied using an amplitude suitable based on RS transmission power.

Since a TRS is transmitted in some bands and some of a subframe in the NCT, as described above, it may be inefficient if the allocation of the downlink transmission power is applied to the TRS without a change. The reason for this is that the entire band to which the downlink transmission power is allocated and the CRS transmitted in all the subframes are assumed.

In the NCT, a TRS may be transmitted in a designated subframe other than all the subframes. In the allocation of downlink power, different criteria may be applied to a subframe in which a TRS is transmitted and a subframe in which the TRS is not transmitted. Furthermore, the allocation of downlink power may be differently configured depending on whether the TRS is transmitted over the entire system bandwidth or in some of a system bandwidth. The RS power parameter of the TRS may be set independently of the RS power parameter of a CRS.

In order to clarify a description, it is said that an RS EPRE is based on a TRS.

Reference Signal Received Power (RSRP) for the NCT may be measured based on a TRS within a frequency band that is considered. Downlink pathloss may be estimated based on the RS power parameter of a TRS and RSRP calculated based on the TRS.

A variety of proposed embodiments regarding power allocation are described below.

Hereinafter, a subframe is illustrated as including 14 OFDM symbols, but this is only an example. A TRS is illustrated as being transmitted in the first, the fifth, the eighth, and the twelfth OFDM symbols, but the location and number of OFDM symbols in which a TRS is transmitted is only illustrative.

An OFDM symbol that is included in a subframe and in which a TRS is transmitted is called a TRS OFDM symbol. An OFDM symbol other than a TRS OFDM symbol is called a non-TRS OFDM symbol.

A system bandwidth (BW) is a BW in which a subframe is transmitted, and a TRS BW is a BW that is included in a system BW and in which a TRS is transmitted.

Figure 3:
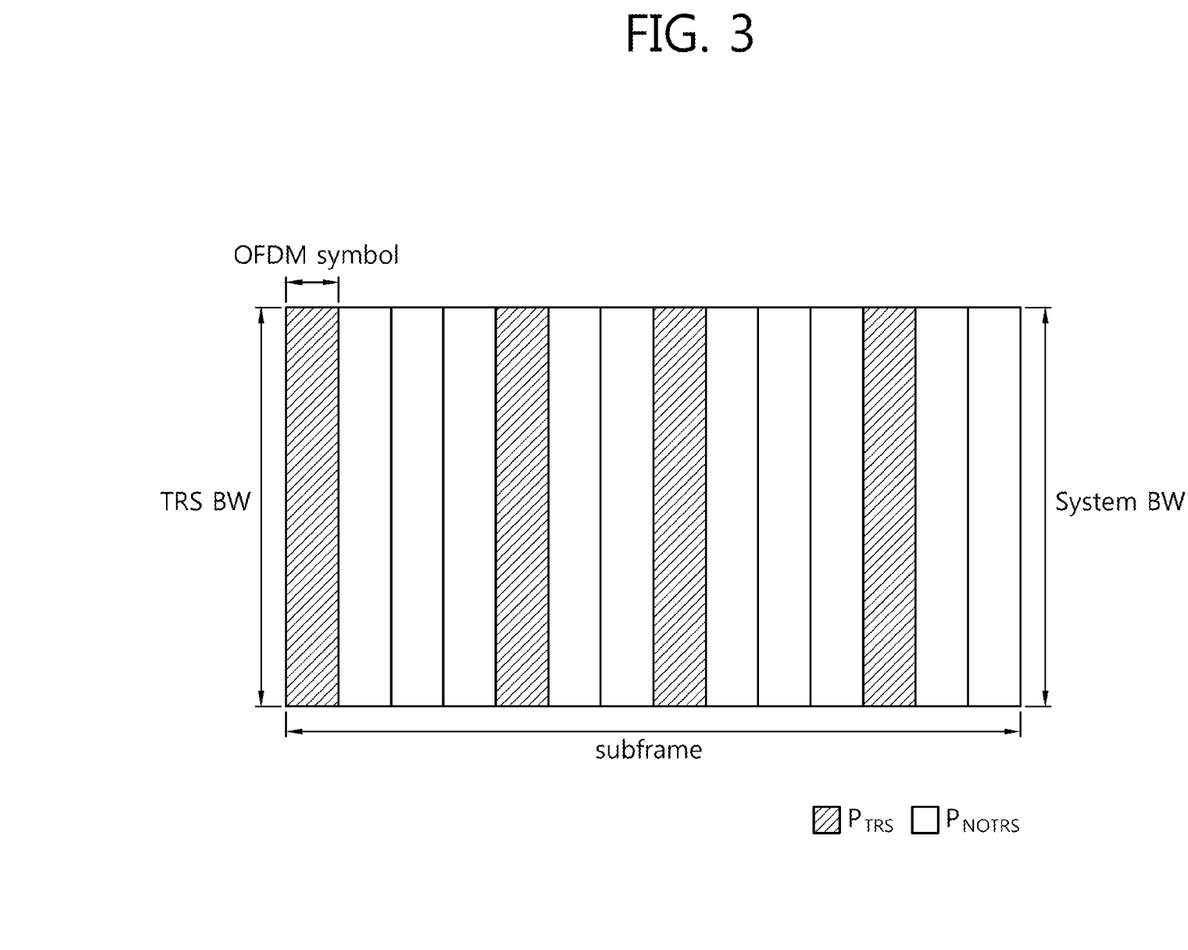
FIG. 3 illustrates the allocation of power in accordance with an embodiment of the present invention.

FIG. 3 illustrates the allocation of power in accordance with an embodiment of the present invention.

The present embodiment is a case where a system BW has the same size as a TRS BW and a TRS is transmitted over the system BW.

An RS RE uses $\rho_{TRS}$ as a PR in a TRS OFDM symbol and uses $\rho_{NOTRS}$ or $\rho_{URS}$ as a PR in a non-TRS OFDM symbol because it has higher transmission power than a PDSCH RE. $\rho_{TRS}$ is a PR in which a case where a PDSCH and power are divided and used in a TRS in a corresponding OFDM symbol is taken into consideration. $\rho_{NOTRS}$ is a PR in which a case where a PDSCH and power are divided and used in a TRS in a corresponding OFDM symbol is not taken into consideration. $\rho_{URS}$ is indicative of a ratio of a URS EPRE and a PDSCH EPRE. $\rho_{URS}$ may be previously designated or may be set by a BS.

$\rho_{TRS}$ may be used as a PR in a TRS OFDM symbol, and $\rho_{NOTRS}$ may be used as a PR in a non-TRS OFDM symbol.

$\rho_{TRS}$ may be used as a PR in a TRS OFDM symbol, and $\rho_{URS}$ may be used as a PR in a non-TRS OFDM symbol. Alternatively, when a URS is transmitted in a non-TRS OFDM symbol, $\rho_{URS}$ may be used. If a URS is not transmitted in a non-TRS OFDM symbol, $\rho_{NOTRS}$ may be used.

$\rho_{URS}$ may be used in all the OFDM symbols regardless of whether or not a TRS is transmitted.

Figure 4:
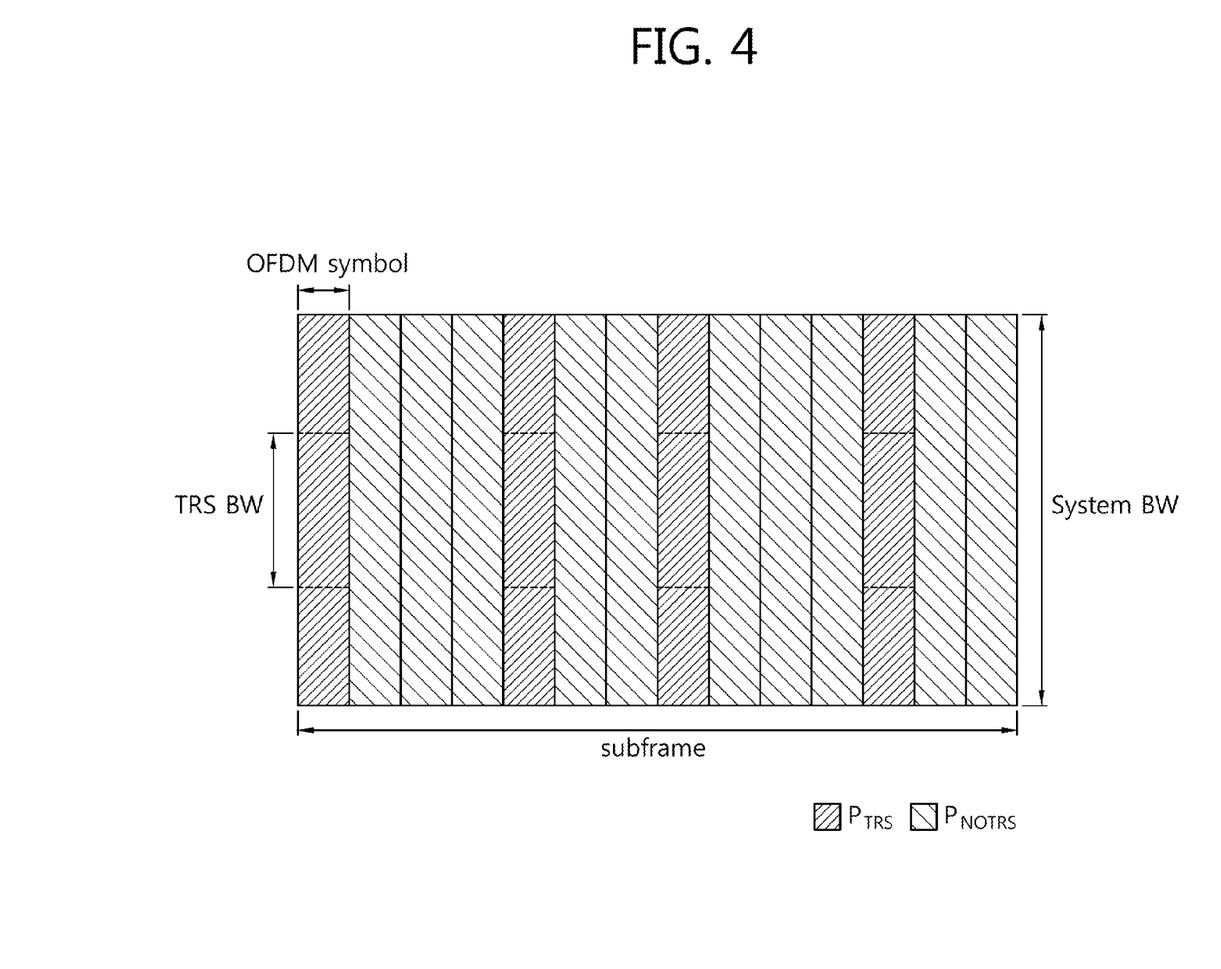
FIG. 4 illustrates the allocation of power in accordance with another embodiment of the present invention.

FIG. 4 illustrates the allocation of power in accordance with another embodiment of the present invention.

The present embodiment is a case where a system BW has a greater size than a TRS BW and a TRS is transmitted in some RBs of a subframe.

$\rho_{TRS}$ may be used as a PR in a TRS OFDM symbol, and $\rho_{NOTRS}$ may be used as a PR in a non-TRS OFDM symbol.

$\rho_{TRS}$ may be used as a PR in a TRS OFDM symbol, and $\rho_{URS}$ may be used as a PR in a non-TRS OFDM symbol. Alternatively, if a URS is transmitted in a non-TRS OFDM symbol, $\rho_{URS}$ may be used. If a URS is not transmitted in a non-TRS OFDM symbol, $\rho_{NOTRS}$ may be used.

$\rho_{URS}$ may be used in all the OFDM symbols regardless of whether or not a TRS is transmitted.

Figure 5:
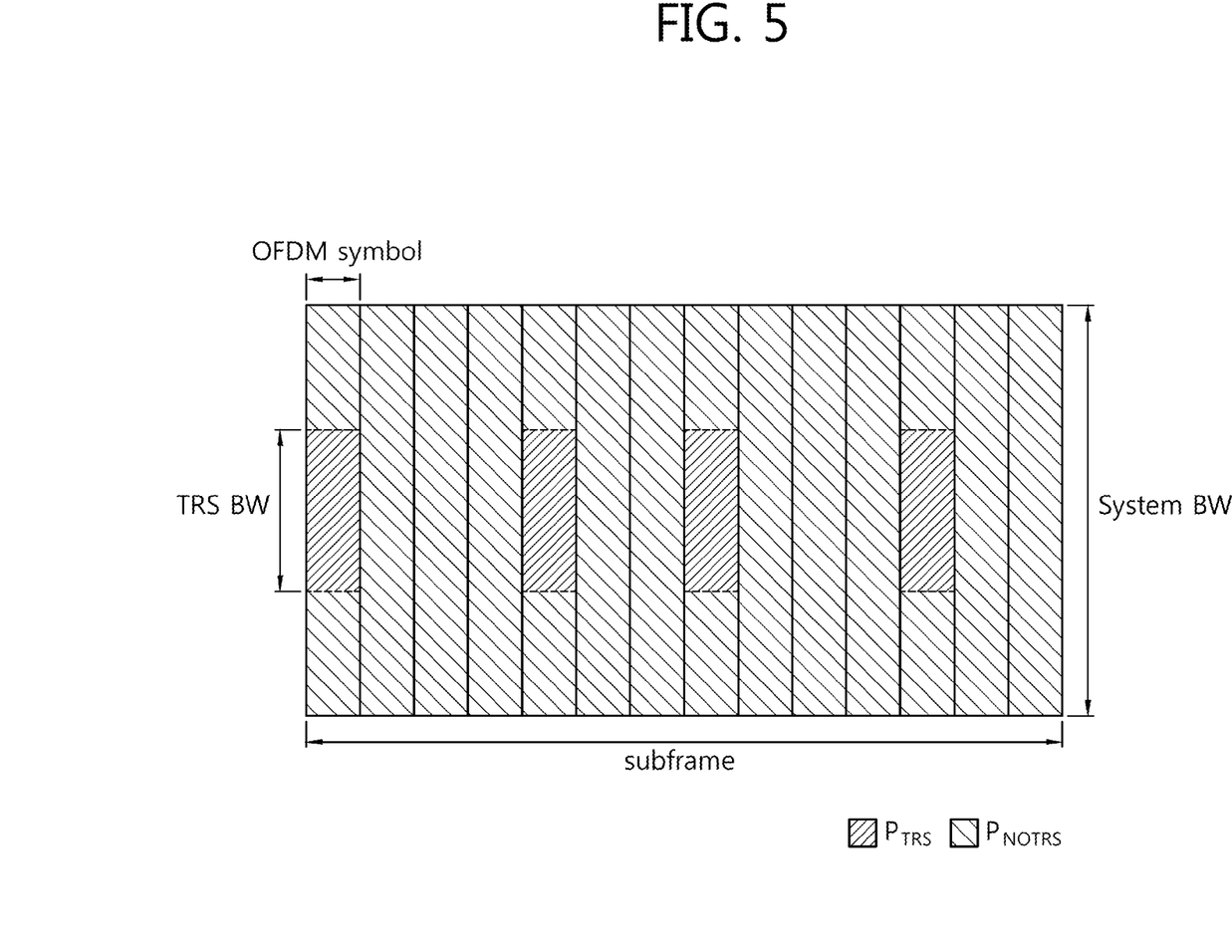
FIG. 5 illustrates the allocation of power in accordance with yet another embodiment of the present invention.

FIG. 5 illustrates the allocation of power in accordance with yet another embodiment of the present invention.

The present embodiment is a case where a system BW has a grater size than a TRS BW and a TRS is transmitted in some RBs of a subframe. Compared to the embodiment of FIG. 4, a PR is determined by taking the TRS BW into consideration.

$\rho_{TRS}$ may be used in the TRS BW of a TRS OFDM symbol, and $\rho_{NOTRS}$ or $\rho_{URS}$ may be used in the remaining bands of the TRS OFDM symbol. $\rho_{NOTRS}$ or $\rho_{URS}$ may be used in a non-TRS OFDM symbol. Alternatively, if a URS is transmitted in a non-TRS OFDM symbol, $\rho_{URS}$ may be used. If a URS is not transmitted in a non-TRS OFDM symbol, $\rho_{NOTRS}$ may be used.

$\rho_{URS}$ may be used in all the OFDM symbols regardless of whether a TRS is transmitted or not or of a TRS BW.

A PR may vary depending on the size of a TRS BW. For example, if a TRS BW is equal to or smaller than 6 RBs, $\rho_{TRS}$ may be used in the TRS BW of a TRS OFDM symbol, and $\rho_{NOTRS}$ or $\rho_{URS}$ may be used in the remaining bands of the TRS OFDM symbol other than the TRS BW. If a TRS BW is greater than 6 RBs, $\rho_{TRS}$ (or $\rho_{NOTRS}$ or $\rho_{URS}$) may be used in a TRS OFDM symbol regardless of the TRS BW. A BS may inform a wireless device of the size of a TRS BW (or information about the number of REs to which a TRS is mapped), that is, a criterion.

A detailed method of obtaining a PR in each OFDM symbol is described below.

In the aforementioned embodiments, the PR is divided into $\rho_{NOTRS}$ and $\rho_{URS}$, but $\rho_{NOTRS}$ and $\rho_{URS}$ are hereinafter assumed to have the same value for the clarity of a description. That is, in the following description, $\rho_{NOTRS}$ may be replaced with $\rho_{URS}$.

Information about $\rho_{NOTRS}$ may be given by a BS. Information about $\rho_{NOTRS}$ may vary depending on the size of a TRS BW. A system BW may be divided into a plurality of subbands, and information about $\rho_{NOTRS}$ may be given to each of the subbands. $\rho_{NOTRS}$ may be determined based on a system BW and/or a TRS BW.

In existing 3GPP LTE, the PR of an OFDM symbol not including a CRS may be represented as $\rho_A$, and the PR of an OFDM symbol including a CRS may be represented as $\rho_B$. Accordingly, it may be said that $\rho_{TRS}$ may correspond to $\rho_B$ in a TRS OFDM symbol and $\rho_{NOTRS}$ may correspond to $\rho_A$ in a non-TRS OFDM symbol.

In this case, $\rho_{TRS}$ and $\rho_{NOTRS}$ may be determined by at least one of the following methods.

(Option A1)

It is assumed that $\rho_A = \rho_{NOTRS}$ and $\rho_B = \rho_{TRS}$ and $\rho_{TRS}$ and $\rho_{NOTRS}$ may be determined based on Table 2.

(Option A2)

A granularity may be controlled based on a ratio of a TRS BW and a system BW. The granularity may be decreased as the system BW and/or the TRS BW are increased. For example, $\rho_{TRS}/\rho_{NOTRS}$ may be decreased as the system BW is increased.

In a TRS OFDM symbol, $\rho_{OTRS}/\rho_{NOTRS}$ may be set as a positive number times the reciprocal number of the number of REs not mapped to a TRS. For example, if the number of Res not mapped to a TRS in a TRS OFDM symbol is 38, $\rho_{OTRS}/\rho_{NOTRS}$ may be set to 1, 37/38, . . . , 1/38.

The following equation is an example in which $\rho_{OTRS}/\rho_{NOTRS}$ are determined.

$$\rho_{TRS}/\rho_{NOTRS} \in \left\{ C \in Z : \frac{M_{RB}N_{RB} - K_{AP}X/M_{RB} - CM_{RB}}{M_{RB}N_{RB} - K_{AP}X/M_{RB}} \right\}$$ [Equation 3]

In Equation 2, X is the number of subcarriers to which a TRS is mapped (or the number of REs to which a TRS is mapped), $N_{RB}$ is a total number of RBs in a system BW, $M_{RB}$ is the number of subcarriers in a single RB (or the number of REs in a single RB) (e.g., $M_{RB}=12$), and $K_{AP}$ is the number of REs per RB that is used to send the TRS within a TRS OFDM symbol depending on the number of antenna ports of the TRS. For example, if the number of antenna ports is 1, $K_{AP}$ may be 2. If the number of antenna ports is 2 or 4, $K_{AP}$ may be 4.

(Option A3)

$\rho_A$ may be set as $\rho_{NOTRS}$, and $\rho_{TRS}$ may be determined based on a TRS BW and a system BW. The following equation illustrates an example in which $\rho_{TRS}$ is determined.

$$\rho_{TRS} = \frac{\rho_B X + \rho_A(N_{RB}M_{RB} - X)}{N_{RB}M_{RB}}$$ [Equation 4]

$\rho_A$ and $\rho_B$ may be determined based on Table 2.

(Option A4)

$\rho_{OTRS}/\rho_{NOTRS}$ may be determined based on a scaling factor $K_{NCT}$ and an offset $\beta_{NCT}$. A granularity may be set so that it is decreased as a system BW and a TRS BW are increased. The scale factor may be determined based on the system BW and/or the TRS BW. The offset is set so that $\rho_{OTRS}/\rho_{NOTRS}$ includes 1.

For example, Table 2 regarding $\rho_A/\rho_B$ may be represented as in the following table.

TABLE 3

| | $\rho_{TRS}/\rho_{NOTRS}$ | |
|---|---|---|
| $P_{B,TRS}$ | One Antenna Port | Two and Four Antenna Ports |
| 0 | $5/K_{NCT} + \beta_{NCT}$ | $5/4 \times 5/K_{NCT} + \beta_{NCT}$ |
| 1 | $4/5 \times 5/K_{NCT} + \beta_{NCT}$ | $5/K_{NCT} + \beta_{NCT}$ |
| 2 | $3/5 \times 5/K_{NCT} + \beta_{NCT}$ | $3/4 \times 5/K_{NCT} + \beta_{NCT}$ |
| 3 | $2/5 \times 5/K_{NCT} + \beta_{NCT}$ | $1/2 \times 5/K_{NCT} + \beta_{NCT}$ |

In Table 3, $P_{B,TRS}$ is a parameter given by a BS.

The scaling factor may be determined based on the number of REs to which a TRS is not mapped within a TRS OFDM symbol and the number of REs to which the TRS is mapped within the TRS OFDM symbol on the basis of a single antenna port. The following equation is an example in which the scaling factor is determined.

$$K_{NCT} = \frac{M_{RB}N_{RB} - K_{AP=1}X/M_{RB}}{K_{AP=1}X/M_{RB}}$$ [Equation 5]

In Equation 5, $K_{AP=1}$ is indicative of the number of REs per RB that are used to send a TRS within a TRS OFDM symbol in a single antenna port. For example, $K_{AP=1}$ may be 2.

The following equation illustrates an example in which the offset is determined.

$$\beta_{NCT} = \frac{K_{NCT} - 5}{K_{NCT}}$$ [Equation 6]

For another example, the scaling factor may be determined as in the following equation based on a ratio of a TRS BW and a system BW.

$$K_{NCT} = \frac{X}{M_{RB}N_{RB}}$$ [Equation 7]

(Option A5)

$\rho_{OTRS}/\rho_{NOTRS}$ may be set based on a ratio of REs not used to send a TRS within a TRS OFDM symbol and REs used to send the TRS. For example, a granularity may be decreased as the ratio is increased.

The following table illustrates an example in which $\rho_{OTRS}/\rho_{NOTRS}$ are set.

TABLE 4

| | $\rho_{TRS}/\rho_{NOTRS}$ | |
|---|---|---|
| $P_{B,TRS}$ | One Antenna Port | Two and Four Antenna Ports |
| 0 | 1 | $1 + G_{NCT,2 \text{ or } 4}$ |
| 1 | $1 - G_{NCT,1}$ | 1 |
| 2 | $1 - 2G_{NCT,1}$ | $1 - G_{NCT,2 \text{ or } 4}$ |
| 3 | $1 - 3G_{NCT,1}$ | $1 - 2G_{NCT,2 \text{ or } 4}$ |

A parameter $G_{NCT,i}$ is indicative of the granularity of the value $\rho_{TRS}/\rho_{NOTRS}$ when the number of antenna ports is i.

The parameter $G_{NCT,i}$ may be determined based on REs not used to send a TRS and/or REs used to send a TRS. For example, the parameter $G_{NCT,i}$ may be defined as in the following equation.

$$G_{NCT,i} = C_{AP=i} \times \frac{K_{AP=i} X / M_{RB}}{M_{RB} N_{RB} - K_{AP=i} X / M_{RB}} \qquad \text{[Equation 8]}$$

In Equation 8, $K_{AP=i}$ is indicative of the number of REs per RB used to send a TRS within a TRS OFDM symbol in an i antenna port. For example, $K_{AP=1}$ may be 2, and $K_{AP=2}$ may be $K_{AP=4}=4$. $C_{AP=i}$ may be a reciprocal number of the number of antenna ports in the TRS OFDM symbol. For example, $C_{AP=1}$ may be 1, and $C_{AP=2}$ may be $C_{AP=4}=1/2$.

The parameter $G_{NCT,i}$ may be defined as in the following equation depending on a ratio of a TRS BW and a system BW.

$$G_{NCT,i} = \frac{X}{M_{RB} N_{RB}} \qquad \text{[Equation 9]}$$

The option A1~the option A5 may be combined. An Option used may be changed depending on a time domain or frequency domain. A BS may inform a wireless device of an Option to be used.

The granularities illustrated in Table 3 and Table 4 are only illustrative, and a BS may use a granularity changed depending on a wireless communication state. For example, when a PDSCH is scheduled only in an RB not corresponding to a TRS BW in a TRS OFDM symbol, a total number of REs for the PDSCH may be increased compared to a case where the TRS is transmitted over the system BW, and transmission power may be increased. The BS may use power higher (or lower) than transmission power obtained in accordance with Table 3 or Table 4 in order to make uniform the transmission power of the TRS OFDM symbol and the transmission power of a non-TRS OFDM symbol.

Figure 6:
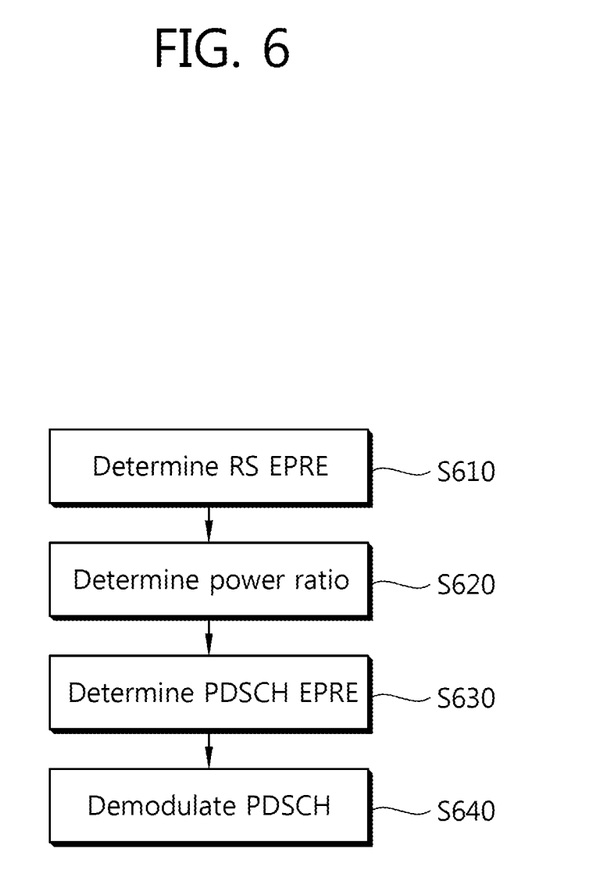
FIG. 6 is a flowchart illustrating a method of receiving downlink data in accordance with an embodiment of the present invention.

FIG. 6 is a flowchart illustrating a method of receiving downlink data in accordance with an embodiment of the present invention. This may be performed by a wireless device.

At step S610, if a corresponding OFDM symbol of a subframe is a TRS OFDM symbol in which a TRS is transmitted, a TRS is received in a TRS BW and an RS EPRE, that is, the EPRE of the TRS, is determined. The RS EPRE may be calculated based on an RS power parameter provided by a BS.

At step S620, a Power Ratio (PR) $\rho_{TRS}$, that is, a ratio of a PDSCH ERPE to the RS EPRE, is determined. If the corresponding OFDM symbol is a non-TRS OFDM symbol, $\rho_{NOTRS}$ is determined. $\rho_{TRS}$ or $\rho_{NOTRS}$ may be determined based on the aforementioned embodiment.

At step S630, the PDSCH EPRE is determined based on the RS EPRE and the PR.

At step S640, the transmission of a PDSCH is determined based on the PDSCH EPRE, and the PDSCH is demodulated.

The wireless device may receive information about the RS power parameter for determining the RS EPRE and information about a parameter $P_B$ for determining the PR from the BS.

Figure 7:
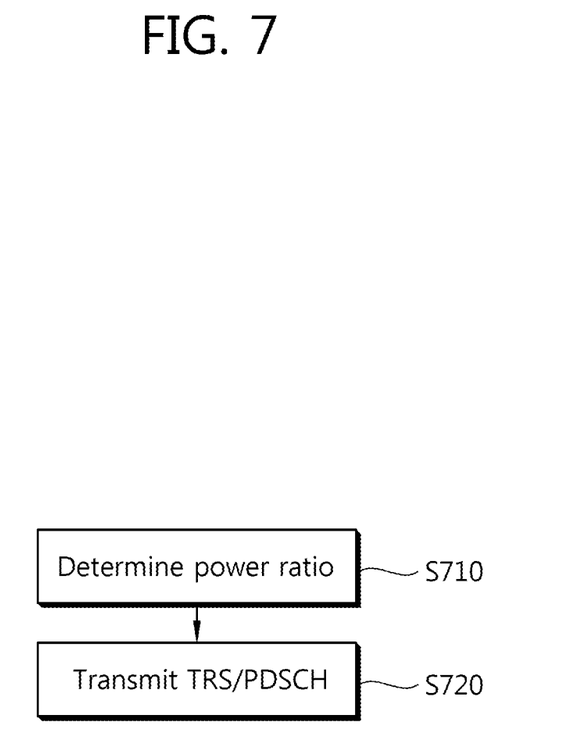
FIG. 7 is a flowchart illustrating a method of allocating downlink power in accordance with an embodiment of the present invention.

FIG. 7 is a flowchart illustrating a method of allocating downlink power in accordance with an embodiment of the present invention. This may be performed by a BS.

At step S710, a PR of an RS EPRE to a PDSCH EPRE is determined. If a corresponding OFDM symbol is a TRS OFDM symbol, $\rho_{TRS}$ is determined. If the corresponding OFDM symbol is a non-TRS OFDM symbol, $\rho_{NOTRS}$ is determined. $\rho_{TRS}$ or $\rho_{NOTRS}$ may be determined based on the aforementioned embodiment.

At step S720, a TRS and/or a PDSCH are transmitted by applying transmission power determined based on the PR.

The BS may send information about an RS power parameter for determining the RS EPRE and information about a parameter $P_B$ for determining the PR to a wireless device.

The allocation of power in a subframe in which a TRS is not transmitted is described below.

In a subframe in which a TRS is not transmitted, a PDSCH EPRE may be determined based on an RS power parameter given by a BS. Alternatively, a wireless device may determine the PDSCH EPRE based on the transmission power of a synchronization signal or the transmission power of a URS. Furthermore, the wireless device may calculate the PDSCH EPRE by applying different criteria to an OFDM symbol including a URS (this is called a URS OFDM symbol) and an OFDM symbol not including the URS (this is called a non-URS OFDM symbol).

In order to obtain a PDSCH EPRE from a subframe not including a TRS, at least one of the followings may be taken into consideration.

(B1) A ratio of an RS power parameter, corresponding to a TRS belonging to a previous subframe (e.g., the most recent subframe), and a PDSCH EPRE may be determined to be $\rho_{NOTRS}$, and the PDSCH EPRE may be determined.

(B2) A ratio of a PDSCH EPRE and the URS EPRE of a corresponding PDSCH may be set as $\rho_{URS}$ that is previously determined or given by a BS, and the PDSCH EPRE may be determined.

(B3) A ratio of a PDSCH EPRE and the URS EPRE of a corresponding PDSCH may be set as $\rho_{URS}$ that is previously determined or given by a BS. Information about the URS EPRE may be given by the BS.

(B4) The power of a synchronization signal received in the most recent subframe may be used as a basis, and a ratio of a PDSCH EPRE and an RS EPRE may be previously designated or given by a BS.

(B5) The transmission power of a CSI-RS received in the most recent subframe may be used as a basis, and a ratio of a PDSCH EPRE and an RS EPRE may be previously designated or given by a BS.

(B6) A signal that is included in a synchronization signal, a CSI-RS, and a TRS and that is received in the most recent subframe may be used as a basis. If the signal is the TRS, the method B3 may be applied. If the signal is the synchronization signal, the method B4 may be applied. If the signal is the CSI-RS, the method B5 may be applied.

In order to determine the PDSCH EPRE of a URS OFDM symbol and the PDSCH EPRE of a non-URS OFDM symbol in a subframe not including a TRS, at least one of the methods B1~B6 may be independently applied.

The following is a more detailed example of the allocation of downlink power in a subframe in which a TRS is not transmitted.

In a first embodiment, the method B1 may be applied to all the OFDM symbols.

In a second embodiment, the method B2 may be applied to all the OFDM symbols.

In a third embodiment, the method B3 may be applied to all the OFDM symbols.

In a fourth embodiment, the method B2 may be applied to a URS OFDM symbol, and the method B1 may be applied to a non-URS OFDM symbol.

In a fifth embodiment, the method B3 may be applied to a URS OFDM symbol, and the method B1 may be applied to a non-URS OFDM symbol.

In a sixth embodiment, the method B2 may be applied to a URS OFDM symbol, and the method B4 may be applied to a non-URS OFDM symbol.

In a seventh embodiment, the method B3 may be applied to a URS OFDM symbol, and the method B4 may be applied to a non-URS OFDM symbol.

In an eighth embodiment, the method B2 may be applied to a URS OFDM symbol, and the method B5 may be applied to a non-URS OFDM symbol.

In a ninth embodiment, the method B3 may be applied to a URS OFDM symbol, and the method B5 may be applied to a non-URS OFDM symbol.

In a tenth embodiment, the method B2 may be applied to a URS OFDM symbol, and the method B6 may be applied to a non-URS OFDM symbol.

In an eleventh embodiment, the method B3 may be applied to a URS OFDM symbol, and the method B6 may be applied to a non-URS OFDM symbol.

The first to the eleventh embodiments may be combined. A BS may select one of the first to the eleventh embodiments and inform a wireless device of the selected one.

Figure 8:
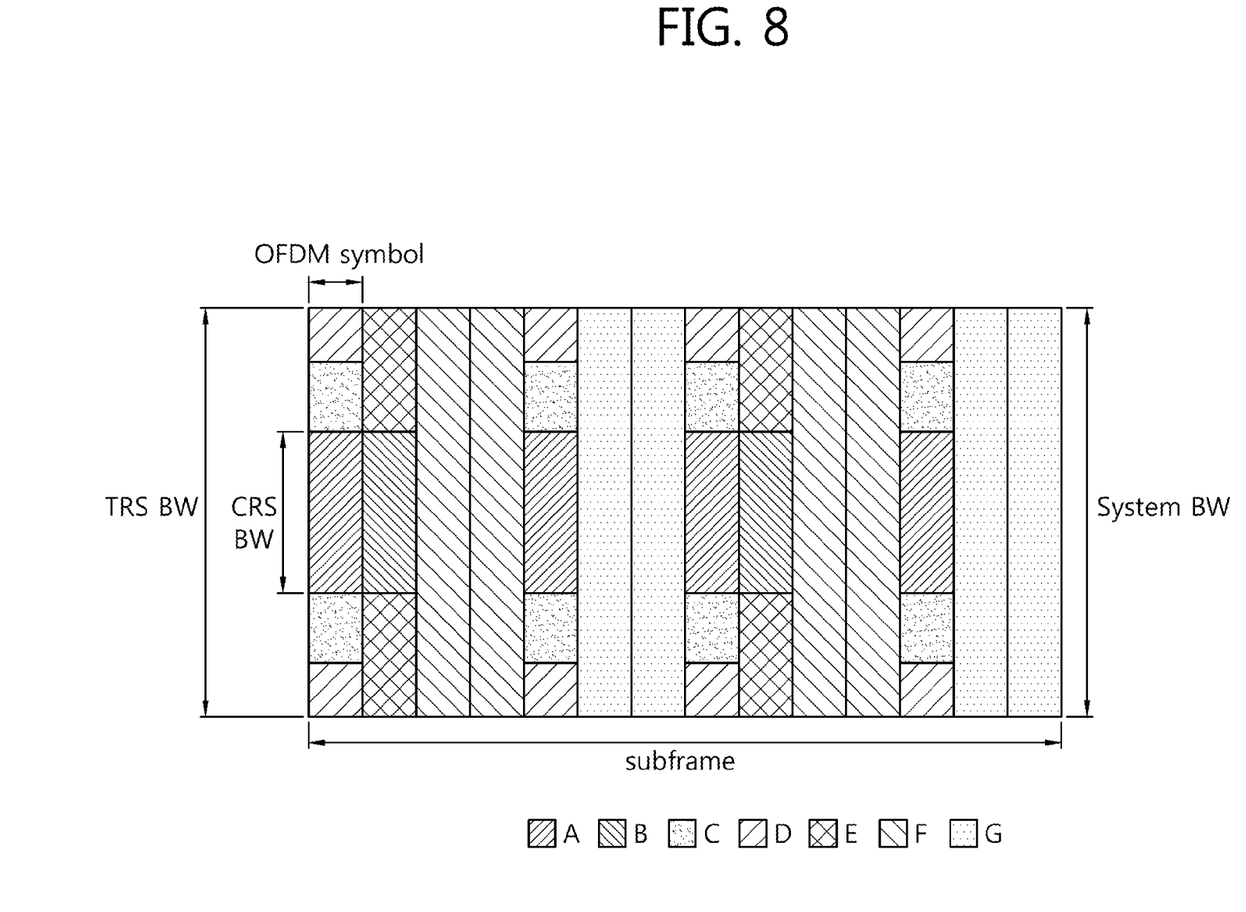
FIG. 8 illustrates the allocation of power in accordance with yet another embodiment of the present invention.

FIG. 8 illustrates the allocation of power in accordance with yet another embodiment of the present invention.

In the present embodiment, a case where both a CRS and a TRS are transmitted in a single OFDM symbol is taken into consideration. The CRS is transmitted in a CRS BW, and the TRS is transmitted in a TRS BW. The case of the CRS BW<the TRS BW<a system BW is taken into consideration, but the present embodiment may also be applied to the TRS BW<the CRS BW<the system BW.

A region 'A' is indicative of an RB in which a CRS is transmitted in an OFDM symbol in which a TRS and the CRS are transmitted and.

A region 'B' is indicative of an RB in which a CRS is transmitted in an OFDM symbol in which the CRS is transmitted.

A region 'C' is indicative of an RB in which a TRS is transmitted in an OFDM symbol in which the TRS and a CRS are transmitted.

A region 'D' is indicative of an RB in which a TRS and a CRS are not transmitted in an OFDM symbol in which the TRS and the CRS are transmitted.

A region 'E' is indicative of an RB in which a CRS is not transmitted in an OFDM symbol in which the CRS is transmitted.

A region 'F' is indicative of an RB in an OFDM symbol in which a CRS and a TRS are not transmitted.

A region 'G' is indicative of an RB in which all RBs or an URS is transmitted in an OFDM symbol in which the URS is transmitted.

In the case of a system in which the simultaneous transmission of a CRS and a TRS is permitted, the RS power parameter of the CRS and the RS power parameter of the TRS may be independently given by a BS. Alternatively, the RS power parameter of the CRS and the RS power parameter of the TRS may be set to the same value.

The antenna ports of the CRS and the TRS may be independently configured, and the antenna port of the TRS may be associated with a specific antenna port of the CRS.

In the region 'B' and the region 'E', as described above, in a subframe in which a TRS is transmitted and a subframe in which a TRS is not transmitted, the TRS may be replaced with a CRS and the allocation of downlink power may be identically performed. In the region 'F' and the region 'G', as described above, in a subframe in which a TRS is transmitted and a subframe in which a TRS is not transmitted, the allocation of downlink power may be performed. If the RS power parameters of a CRS and a TRS are identically set, the allocation of downlink power may be performed based on the CRS.

If the RS power parameters of a CRS and a TRS are identically set, the TRS may be matched with a combination of the CRS and the TRS in the aforementioned embodiments in the region 'A', the region 'C', and the region 'D', If the RS power parameters of a CRS and a TRS are independently set, the power parameters of the CRS and the TRS may be combined and used in the region 'A', the region 'C', and the region 'D'.

In the region 'A', $\rho_A$ may be set as a ratio of a PDSCH EPRE and a CRS EPRE. In the region 'C', $\rho_{TRS}$ may be set as a ratio of a PDSCH EPRE and a TRS EPRE. In the region 'D', $\rho_A$ may be set based on a CRS, or $\rho_{NOTRS}$ may be set based on a TRS. $\rho_A$ or $\rho_{NOTRS}$ may be given by a BS.

In the region 'A', the region 'C', and the region 'D', a power ratio may be set based on a CRS, and $\rho_B$ may be set based on a ratio of a PDSCH EPRE and an RS EPRE.

In the region 'A', the region 'C', and the region 'D', a power ratio may be set based on a CRS, and $\rho_{TRS}$ may be set based on a ratio of a PDSCH EPRE and an RS EPRE.

Figure 9:
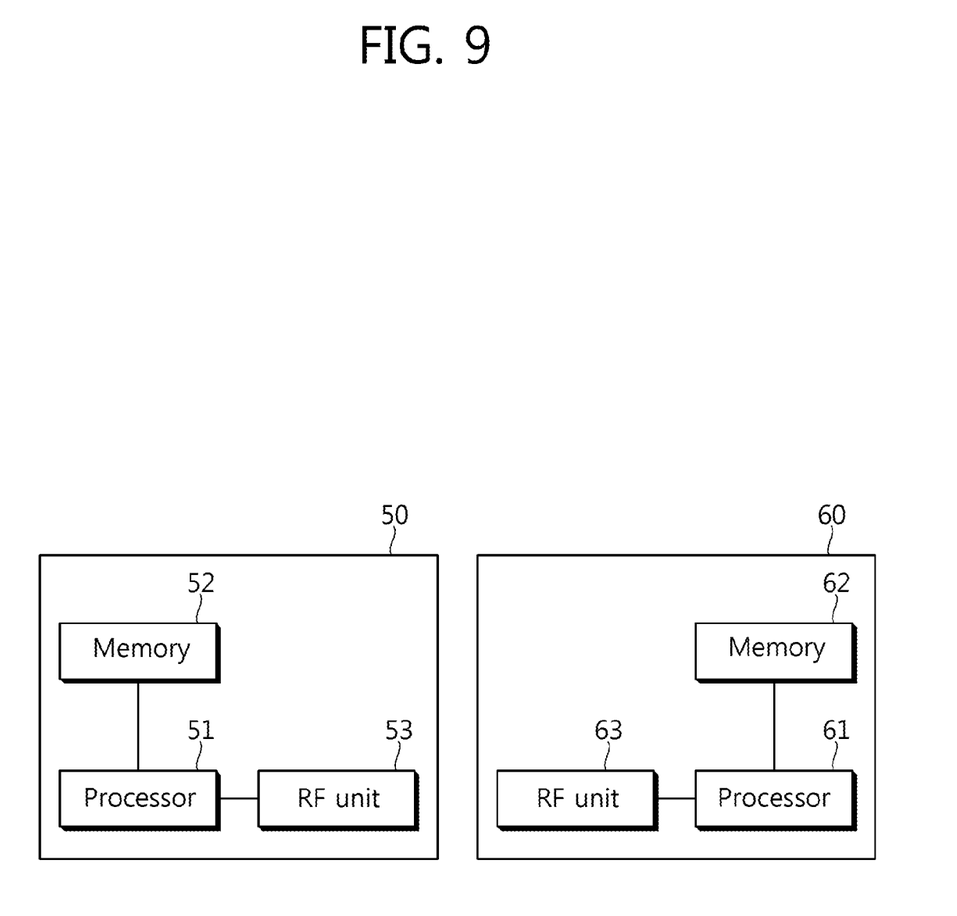
FIG. 9 is a block diagram illustrating a wireless communication system in which an embodiment of the present invention is implemented.

FIG. 9 is a block diagram illustrating a wireless communication system in which an embodiment of the present invention is implemented.

A BS 50 includes a processor 51, memory 52, and a Radio Frequency (RF) unit 53. The memory 52 is connected to the processor 51 and stores various pieces of information for driving the processor 51. The RF unit 53 is connected to the processor 51 and sends and/or receives radio signals. The processor 51 implements the operations of the BS in the proposed functions, processes and/or methods. The processor 51 may determine a power ratio and send a reference signal and/or a data channel through the RF unit.

A wireless device 60 includes a processor 61, memory 62, and an RF unit 63. The memory 62 is connected to the processor 61 and stores various pieces of information for driving the processor 61. The RF unit 63 is connected to the processor 61 and sends and/or receives radio signals. The processor 61 implements the operations of the wireless device in the proposed functions, processes and/or methods. The processor 61 may determine the transmission power of a reference signal and the transmission power of a data channel and demodulate the data channel.

The processor may include Application-Specific Integrated Circuits (ASICs), other chipsets, logic circuits, and/or data processors. The memory may include Read-Only Memory (ROM), Random Access Memory (RAM), flash memory, memory cards, storage media and/or other storage devices. The RF unit may include a baseband circuit for processing a radio signal. When the aforementioned embodiment is implemented in software, the aforementioned scheme may be implemented using a module (process or function) which performs the above function. The module may be stored in the memory and executed by the processor. The memory may be disposed to the processor internally or externally and connected to the processor using a variety of well-known means.

In the above exemplary systems, although the methods have been described on the basis of the flowcharts using a series of the steps or blocks, the present invention is not limited to the sequence of the steps, and some of the steps may be performed at different sequences from the remaining steps or may be performed simultaneously with the remaining steps. Furthermore, those skilled in the art will understand that the steps shown in the flowcharts are not exclusive and may include other steps or one or more steps of the flowcharts may be deleted without affecting the scope of the present invention.

What is claimed is:

1. A method for receiving downlink data in a wireless communication system, the method comprising:
    determining an Energy Per Resource Element (EPRE) of a reference signal received in a transmission bandwidth of an Orthogonal Frequency Division Multiplexing (OFDM) symbol;
    determining a power ratio of the EPRE of the reference signal to an EPRE of a physical downlink shared channel (PDSCH) based on the transmission bandwidth;
    determining the EPRE of the PDSCH based on the EPRE of the reference signal and the power ratio; and
    demodulating the PDSCH based on the EPRE of the PDSCH,
    wherein the transmission bandwidth is smaller than a system bandwidth,
    wherein the power ratio is determined based on X, $N_{RB}$, and $M_{RB}$, and
    wherein X is a number of subcarriers to which the reference signal is mapped in the transmission bandwidth, $N_{RB}$ is a total number of Resource Blocks (RBs) in a system bandwidth, and $M_{RB}$ is a number of subcarriers in an RB.

2. The method of claim 1, wherein the EPRE of the reference signal is determined based on a power parameter provided by a base station.

3. The method of claim 1, wherein the power ratio is determined based on a scaling factor $$K_{NCT} = \frac{X}{M_{RB} N_{RB}}.$$

4. The method of claim 3, wherein the power ratio is determined based on the scaling factor and an offset $$\beta_{NCT} = \frac{K_{NCT} - 5}{K_{NCT}}.$$

5. The method of claim 1, further comprising:
    receiving information about the transmission bandwidth from a base station.

6. The method of claim 1, wherein the reference signal is generated based on a cell identifier.

7. The method of claim 1, wherein the reference signal is used for synchronization tracking.

8. A wireless device for receiving downlink data in a wireless communication system, the wireless device comprising:
    a Radio Frequency (RF) unit configured to transmit and receive radio signals; and
    a processor connected to the RF unit and configured to:
        determine an Energy Per Resource Element (EPRE) of a reference signal received in a transmission bandwidth of an Orthogonal Frequency Division Multiplexing (OFDM) symbol,
        determine a power ratio of the EPRE of the reference signal to an EPRE of a physical downlink shared channel (PDSCH) based on the transmission bandwidth,
        determine the EPRE of the PDSCH based on the EPRE of the reference signal and the power ratio, and
        demodulate the PDSCH based on the EPRE of the PDSCH,
    wherein the transmission bandwidth is smaller than a system bandwidth,
    wherein the power ratio is determined based on X, $N_{RB}$, and $M_{RB}$, and
    wherein X is a number of subcarriers to which the reference signal is mapped in the transmission bandwidth, $N_{RB}$ is a total number of Resource Blocks (RBs) in a system bandwidth, and $M_{RB}$ is a number of subcarriers in an RB.

9. The wireless device of claim 8, wherein the EPRE of the reference signal is determined based on a power parameter provided by a base station.

* * * * *